(12) United States Patent
Furuta et al.

(10) Patent No.: US 7,322,210 B2
(45) Date of Patent: Jan. 29, 2008

(54) RECEIVER DRIER WITH RELIEF VALVE

(75) Inventors: Takuji Furuta, Tokyo (JP); Kouji Hosokawa, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 435 days.

(21) Appl. No.: 10/995,108

(22) Filed: Nov. 24, 2004

(65) Prior Publication Data
US 2005/0115270 A1    Jun. 2, 2005

(30) Foreign Application Priority Data
Nov. 27, 2003    (JP) .............................. 2003-396968

(51) Int. Cl.
F25B 39/04    (2006.01)
F25B 43/04    (2006.01)
(52) U.S. Cl. .......................................... 62/509; 62/475
(58) Field of Classification Search .................. 34/242; 62/475, 509; 251/129.08, 129.09, 30.04
See application file for complete search history.

(56) References Cited

U.S. PATENT DOCUMENTS 5,629,660 A * 5/1997 Kenyon et al. ........ 251/129.08
5,868,002 A * 2/1999 Matsubayashi .............. 62/509
5,915,665 A * 6/1999 Paese et al. ............. 251/30.04

FOREIGN PATENT DOCUMENTS

JP    07-190567 A    7/1995

OTHER PUBLICATIONS

Mahmoud Ghodbane, Ph.D., et al., "R-152a Mobile A/C with Directed Relief Safety System," SAE Automotive Alternate Refrigeration System, 23 sheets, General Motors, U.S. EPA and Delphi (Jul. 15-17, 2003).

* cited by examiner

Primary Examiner—Jiping Lu
(74) Attorney, Agent, or Firm—Rader, Fishman & Grauer PLLC

(57) ABSTRACT

The invention provides a relief valve for discharging refrigerant in a receiver drier equipped to an air conditioner of a car. A receiver drier 1 of an air conditioner of a car has an inlet path 44 and an outlet path 46 of refrigerant formed to a body 10, and retains refrigerant. A valve chamber 184 is formed to the end of the body 10, which communicates with the atmosphere via a path 182 and a path 184. A plunger 170 of a solenoid valve 100 is regularly in contact with a valve seat 180. When power is supplied to the coil 120 based on a signal from a sensor, an attractor 140 separates the plunger 170 from the valve seat 180 and allows the refrigerant to be discharged to the atmosphere.

1 Claim, 2 Drawing Sheets

RECEIVER DRIER WITH RELIEF VALVE

The present application is based on and claims priority of Japanese patent application No. 2003-396968 filed on Nov. 27, 2003, the entire contents of which are hereby incorporated by reference.

BACKGROUND OF THE INVENTION

1. Field of the Invention

The present invention relates to a receiver drier of an air conditioner of a car for temporarily retaining a liquid-phase refrigerant used in a refrigeration system of the car.

2. Description of the Related Art

Patent document 1; Japanese Patent Application Laid-Open Publication No. 7-190567; discloses a receiver drier used in the air conditioner of a car.

The receiver drier disclosed in above patent document 1 is equipped with a cylindrical body with a bottom and having an opening formed at the lower area thereof, a drier member disposed within the body, a head member functioning as a sealing member for airtightly sealing the opening portion of the body, and an inlet and an outlet of a refrigerant formed to the head member.

According to such prior art receiver drier, the refrigerant flows in through the bottom portion of the cylindrical receiver drier and passes through a filter member and a drier member, during which the moisture and impurities in the refrigerant are removed. Thereafter, the refrigerant is sent out through the outlet formed to the bottom portion of the receiver drier, so the layout of the inlet-outlet pipe of the refrigerant is simplified.

Recently, the refrigerant used in a refrigeration cycle is required to have a property that has small impact on the environment. However, some types of refrigerants are harmful to the human body or are inflammable.

In a refrigeration cycle using such types of refrigerant, in case of an emergency, such as when the refrigerant is filled in a chamber due to gas leak or when gas leak occurs by collision of the vehicle, it becomes necessary to discharge the refrigerant rapidly to the atmosphere.

Non-patent document 1; Jul. 15-17 2003 SAE Automotive Alternate Refrigeration Systems, "R-152a Mobile A/C with Directed Relief Safety System", Mahmoud Ghodbane, Ph. D., James A. Baker, William R. Hill and Stephen O. Andersen, Ph. D.; discloses a refrigeration cycle that discharges the refrigerant to the atmosphere at times of emergency.

SUMMARY OF THE INVENTION

The present invention provides a solenoid valve-type relief valve to the receiver drier, enabling the refrigerant to be discharged to the atmosphere in case of an emergency.

The receiver drier according to the present invention is equipped with a cylindrical body having an opening at a bottom portion thereof, a sealing member for airtightly sealing an opening portion of the body, an inlet path and an outlet path for a refrigerant disposed to the sealing member, and a solenoid valve for discharging the refrigerant in the body to the atmosphere.

Further, the present receiver drier is equipped with a valve chamber having a path that communicates with the body, and a valve seat formed between the valve chamber and the path that communicates with the atmosphere, and the solenoid valve is equipped with a plunger capable of moving toward and away from the valve seat.

Moreover, the solenoid valve is equipped with a magnet coil, an attractor that generates magnetic attraction by the magnet coil, and a spring disposed between the attractor and the plunger.

As mentioned, the receiver drier according to the present invention is equipped with a cylindrical body having an opening at a bottom portion thereof and a sealing member for sealing an opening portion of the body, with an inlet path and an outlet path of refrigerant formed to the sealing member. Thus, the present invention enables to provide a receiver drier that is small-sized and light-weight.

Further, the sealing member for sealing the opening portion of the body can be formed by preparing via a cold forging process a member having a disk-shaped sealing-portion covering the opening portion of the body and a mounting portion protruded from the sealing portion toward the axial direction of the body. Since the member can be formed via a process that requires minimum costs, the yield ratio of the material can be improved and the weight of the member can be cut down effectively.

Incidentally, the sealing member can also be formed to have only the disk-shaped member.

Another advantage of the present invention is that since the structure for mounting the receiver drier does not protrude to the exterior, the mounting space for the receiver drier can be retained easily.

Even further, since according to the present invention the refrigerant will not reach a pressure sensing means directly, it enables protection of the pressure sensing means.

DETAILED DESCRIPTION OF THE PREFERRED EMBODIMENTS

Figure 1:
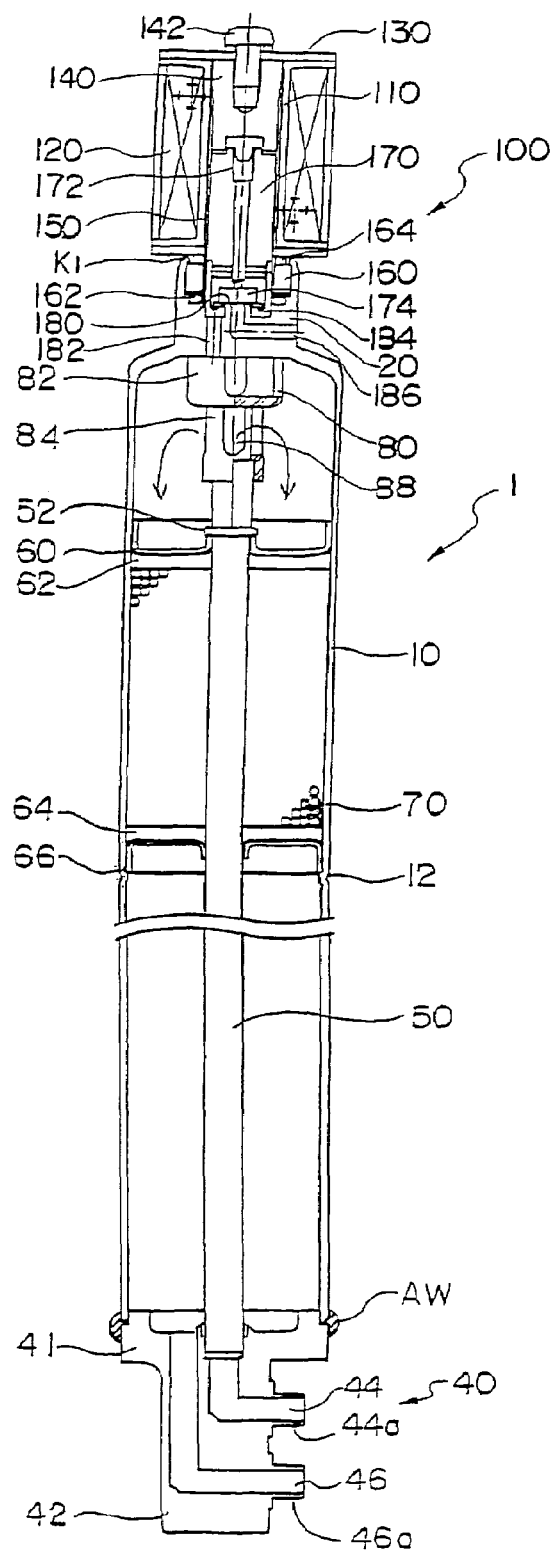
FIG. 1 is a cross-sectional view showing one embodiment of the receiver drier according to the present invention.

FIG. 1 is a cross-sectional view showing one preferred embodiment of the receiver drier according to the present invention.

The receiver drier, the whole of which is denoted by reference number 1, has a cylindrical body 10 with a bottom and having one end thereof opened. This body 10 is formed for example by processing an aluminum alloy material via a cold forging process into a long cylinder with a bottom. Since the aluminum alloy has good workability, it is also possible to form an integral boss portion 20, which is formed to extend outward from the bottom portion.

The boss portion 20 is formed narrower than the outer diameter of the body 10, thereby contributing to the cut down of material and weight of the receiver drier. A sealing member 40 made of aluminum alloy is welded and fixed to the opening portion of the body 10 via an arc weld portion AW.

The sealing member 40 is formed of a disk-shaped sealing portion 41 and a square column-shaped mounting portion 42 that is formed integrally with and protruded from the sealing portion 41. The mounting portion 42 has an L-shaped refrigerant inlet path 44 and an L-shaped refrigerant outlet path 46 formed thereto, both paths having pipe-shaped ends 44a and 46a, respectively.

Moreover, the receiver drier 1 is attached to a separate device through use of a bolt hole with a bottom formed to the mounting portion 42. At this time, by inserting the pipe-shaped ends 44a and 46a to the counterpart device, the receiver drier can be connected easily to the counterpart device.

One end of a pipe 50 is inserted to the opening portion of the sealing member 40 communicated with the refrigerant inlet path 44, and the other end of the pipe 50 is in contact with the inner upper end of the body 10 via a pipe support member 80.

A drying chamber is defined inside the body 10 by a pair of filters 62 and 64, in which is filled a drying agent 70. A first retainer plate 60 is disposed on the upper surface of the upper filter 62 and supports the filter 62. The retainer plate 60 can be formed for example of a meshed metal plate.

The first retainer plate 60 is positioned within the body 10 by a ring-shaped extruded portion 52 formed to the pipe 50 disposed within the body.

A second retainer plate 66 supports the lower side of the lower filter 64. The second retainer plate 66 is positioned within the body 10 by a projection 12 protruded toward the inner direction of the body 10. The projection 12 is disposed at three locations along the circumference. Instead of forming the projections through notch processing, it is possible to form a groove that protrudes inwardly through a rolling process.

A pipe support member 80 is formed for example by molding a synthetic resin material, and has a pipe attaching portion 84 and a seat portion 82.

The refrigerant flowing in through the pipe 50 is filled in the body 10 via a slit 88.

A solenoid valve 100 functioning as a relief valve is attached to the boss portion 20.

The solenoid valve 100 has a magnet coil 120 mounted to the outer circumference of a pipe member 150. An attractor 140 is fixed via welding to the upper portion of the pipe member 150, and a case housing the magnet coil 120 is fixed to the attractor 140 via a screw 142.

The lower end of the pipe member 150 is inserted to the opening of the boss portion 20, and fixed to the upper end of the boss portion 20 via a ring-shaped pressurizing member 160 forming a crimped portion $K_1$. A flange portion is formed to the lower end of the pipe member 150 to achieve a secure fixture, and a seal member 162 is inserted under the pressurizing member 160 to assure the sealed condition. Moreover, an elastic member 164 is inserted above the pressurizing member 160 to prevent direct contact with the case 130.

A plunger 170 is inserted slidably in the pipe member 150. A spring 172 is inserted between the plunger 170 and the attractor 140, pressing the plunger 170.

A valve member 174 is attached to the end of the plunger 170. The valve member 174 is made of an elastic material such as plastic, and is regularly in contact with a valve seat 180.

A path 182 communicating with the inside of the body 10 of the receiver drier is for introducing the refrigerant to a valve chamber 184.

On the other hand, the valve chamber 184 is communicated to the atmosphere via a valve seat 180 and a path 186.

The valve seat 180 is regularly closed by the valve member 174 of the plunger 170, preventing the refrigerant in the receiver drier from leaking to the atmosphere.

When collision or the like of the car equipped with the air conditioner occurs, power is supplied to the coil 120 based on a signal received from a sensor detecting the impact. By the magnetic attraction generated by the coil 120, the attractor 140 attracts the plunger 170 resisting the force of the spring 172.

Along with the movement of the plunger 170, the valve member 174 is separated from the valve seat 180, and the refrigerant within the receiver drier is discharged to the atmosphere through the path 182, the valve chamber 184 and the path 186.

In the above description, the inlet path 44 and the outlet path 46 of refrigerant were L-shaped, but the present invention is not restricted to such example, and it is of course possible to form the paths perpendicularly to the mounting portion.

Figure 2:
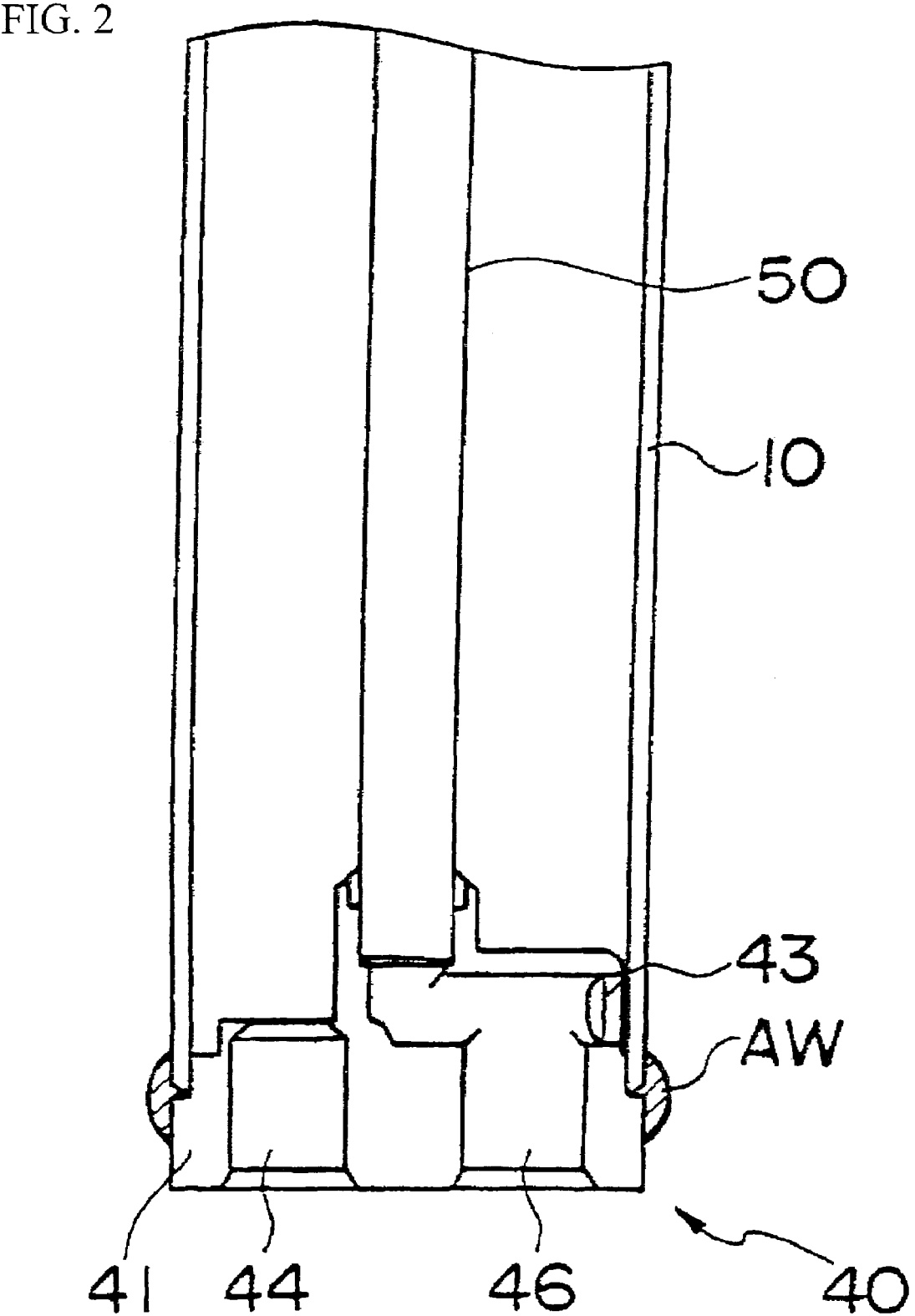
FIG. 2 is a cross-sectional view showing a relevant portion of another embodiment of the receiver drier according to the present invention.

FIG. 2 shows an arrangement of the body 10 and the sealing member 40 of FIG. 1, and since the other components are identical to those of the example of FIG. 1, they are omitted from the drawing. In this example, the inlet path 44 and the outlet path 46 are disposed in the direction perpendicular to the mounting portion 41, that is, in the axial direction of the body 10. The outlet path 46 has a connecting portion with the pipe 50 formed orthogonal to the axial direction and sealed via a seal post 43.

Needless to add, instead of using the above-mentioned sensor, it is possible to use a sensor to detect abnormal pressure or abnormal temperature, and upon receiving the detection signal, supplying power to the coil 20.

What is claimed is:

1. A receiver drier equipped to a refrigeration system of a car for temporarily retaining a liquid-phase refrigerant, the receiver drier comprising:

a cylindrical body having an opening at a bottom portion thereof;

a sealing member for airtightly sealing an opening portion of the body;

an inlet path and an outlet path for the refrigerant formed to the sealing member;

a solenoid valve for discharging the refrigerant within the body to the atmosphere;

a valve chamber having a path communicated with an interior of the body; and a valve seat formed between the valve chamber and a path communicated to the atmosphere, wherein the solenoid valve is equipped with a plunger that can be in contact with and separated from the valve seat, the solenoid valve is equipped with a magnet coil, an attractor that generates magnetic attraction by the magnet coil and a spring disposed between the attractor and the plunger.

* * * * *